United States Patent
Mauk et al.

(10) Patent No.: US 9,841,799 B2
(45) Date of Patent: Dec. 12, 2017

(54) SYSTEM AND METHOD FOR USING A NETWORK TO CONTROL A POWER MANAGEMENT SYSTEM

(71) Applicant: Kohler Co., Kohler, WI (US)

(72) Inventors: Richard A. Mauk, Sheboygan, WI (US); William Herman Gross, Oostburg, WI (US); Gary Allen Kroll, Sheboygan, WI (US); Jayson Pierringer, Kohler, WI (US)

(73) Assignee: Kohler Co., Kohler, WI (US)

( * ) Notice: Subject to any disclaimer, the term of this patent is extended or adjusted under 35 U.S.C. 154(b) by 432 days.

(21) Appl. No.: 13/664,677

(22) Filed: Oct. 31, 2012

(65) Prior Publication Data

US 2013/0159738 A1     Jun. 20, 2013

Related U.S. Application Data

(60) Provisional application No. 61/577,816, filed on Dec. 20, 2011.

(51) Int. Cl.
   *G06F 1/26*     (2006.01)
   *G05B 15/02*    (2006.01)

(52) U.S. Cl.
   CPC .............. *G06F 1/266* (2013.01); *G05B 15/02* (2013.01); *G05B 2219/2642* (2013.01)

(58) Field of Classification Search
   CPC ........... G06F 1/266; G06F 1/26; G05B 15/02; G05B 2219/2642; H02J 4/00; H02J 9/06; H02J 9/08; Y10T 307/391; Y10T 307/615; Y10T 307/696

USPC .................................................. 700/286, 297
   See application file for complete search history.

(56) References Cited

U.S. PATENT DOCUMENTS

| | | | |
|---|---|---|---|
| 4,031,406 A | 6/1977 | Leyde et al. | |
| 4,034,233 A | 7/1977 | Leyde | |
| 4,064,485 A | 12/1977 | Leyde | |
| 4,099,067 A | 7/1978 | Szentes et al. | |
| 4,639,657 A | 1/1987 | Friedrich | |

(Continued)

FOREIGN PATENT DOCUMENTS

| | | |
|---|---|---|
| CN | 1603611 A | 4/2005 |
| CN | 101553968 A | 10/2009 |

(Continued)

OTHER PUBLICATIONS

Masahiro Inoue et. al., (Network Architecture for Home Energy Management System, IEEE Transactions on Consumer Electronics, vol. 49, Issue 3, Aug. 2003, pp. 606-613.*

(Continued)

*Primary Examiner* — Thomas Lee
*Assistant Examiner* — Chad Erdman
(74) *Attorney, Agent, or Firm* — Schwegman Lundberg & Woessner, P.A.

(57) ABSTRACT

Some embodiments relate to a method of using a network to control a power management system. The method includes using the network to access a generator controller that is part of the power management system. The method further includes using the network to exchange communications with the generator controller in order to permit the generator controller to control other electronic components that are part of the power management system.

18 Claims, 6 Drawing Sheets

(56) References Cited

U.S. PATENT DOCUMENTS

| | | |
|---|---|---|
| 4,701,690 A | 10/1987 | Fernandez et al. |
| 4,731,547 A | 3/1988 | Alenduff et al. |
| 4,800,291 A | 1/1989 | Bowers |
| 4,982,149 A | 1/1991 | Shimanuki |
| 5,294,879 A | 3/1994 | Freeman |
| 5,414,640 A | 5/1995 | Seem |
| 5,422,517 A | 6/1995 | Verney et al. |
| 5,604,421 A | 2/1997 | Barnsley |
| 5,640,060 A | 6/1997 | Dickson |
| 5,684,710 A | 11/1997 | Ehlers et al. |
| 5,761,073 A | 6/1998 | Dickson |
| 5,861,683 A | 1/1999 | Engel et al. |
| 5,880,537 A | 3/1999 | Windhorn |
| 6,067,482 A | 5/2000 | Shapiro |
| 6,104,171 A | 8/2000 | Dvorsky et al. |
| 6,107,927 A | 8/2000 | Dvorsky et al. |
| 6,114,775 A | 9/2000 | Chung et al. |
| 6,163,088 A | 12/2000 | Codina et al. |
| 6,172,432 B1 | 1/2001 | Schnackenberg et al. |
| 6,191,500 B1 | 2/2001 | Toy |
| 6,362,985 B1 | 3/2002 | Haneda et al. |
| 6,531,790 B2 | 3/2003 | Panuce et al. |
| 6,552,888 B2 | 4/2003 | Weinberger |
| 6,593,670 B2 | 7/2003 | Anderson |
| 6,631,310 B1 | 10/2003 | Leslie |
| 6,653,821 B2 | 11/2003 | Kern et al. |
| 6,657,416 B2 | 12/2003 | Kern et al. |
| 6,668,629 B1 | 12/2003 | Leslie |
| 6,686,547 B2 | 2/2004 | Kern et al. |
| 6,691,065 B2 | 2/2004 | Hayashi et al. |
| 6,739,145 B2 | 5/2004 | Bhatnagar |
| 6,747,368 B2 | 6/2004 | Jarrett, Jr. |
| 6,791,208 B2 | 9/2004 | Pfeiffer |
| 6,798,187 B1 | 9/2004 | Czarnecki |
| 6,801,019 B2 | 10/2004 | Haydock et al. |
| 6,825,578 B2 | 11/2004 | Perttu |
| 6,833,694 B2 | 12/2004 | Ikekame |
| 6,876,103 B2 | 4/2005 | Radusewicz et al. |
| 6,882,904 B1 | 4/2005 | Petrie et al. |
| 6,912,889 B2 | 7/2005 | Staphanos et al. |
| 6,983,640 B1 | 1/2006 | Staphanos et al. |
| 7,015,599 B2 | 3/2006 | Gull |
| 7,053,497 B2 | 5/2006 | Sodemann et al. |
| 7,119,457 B1 | 10/2006 | Flegel |
| 7,133,787 B2 | 11/2006 | Mizumaki |
| 7,146,256 B2 * | 12/2006 | Hibi et al. .................. 700/286 |
| 7,149,605 B2 | 12/2006 | Chassin et al. |
| 7,177,612 B2 | 2/2007 | Nakamura et al. |
| 7,177,728 B2 | 2/2007 | Gardner |
| 7,208,850 B2 | 4/2007 | Turner |
| 7,218,998 B1 | 5/2007 | Neale |
| 7,230,345 B2 | 6/2007 | Winnie et al. |
| 7,239,045 B2 | 7/2007 | Lathrop |
| 7,245,036 B2 | 7/2007 | Endou et al. |
| 7,274,974 B2 | 9/2007 | Brown |
| 7,336,003 B2 | 2/2008 | Lathrop et al. |
| 7,345,456 B2 | 3/2008 | Gibbs et al. |
| 7,356,384 B2 | 4/2008 | Gull et al. |
| 7,362,696 B2 | 4/2008 | Ferry et al. |
| 7,446,425 B2 | 11/2008 | Sato |
| 7,460,931 B2 | 12/2008 | Jacobson |
| 7,489,988 B2 | 2/2009 | Matsui et al. |
| 7,521,822 B2 | 4/2009 | Lorenz |
| 7,557,544 B2 | 7/2009 | Heinz et al. |
| 7,573,145 B2 | 8/2009 | Peterson |
| 7,579,712 B2 | 8/2009 | Yanagihashi et al. |
| 7,582,986 B2 | 9/2009 | Folkers et al. |
| 7,598,623 B2 | 10/2009 | Fattal et al. |
| 7,608,948 B2 | 10/2009 | Nearhoof et al. |
| 7,619,324 B2 | 11/2009 | Folken et al. |
| 7,656,060 B2 | 2/2010 | Algrain |
| 7,687,929 B2 | 3/2010 | Fattal |
| 7,715,951 B2 | 5/2010 | Forbes, Jr. et al. |
| 7,747,355 B2 | 6/2010 | Bulthaup et al. |
| 7,778,737 B2 | 8/2010 | Rossi et al. |
| 7,786,616 B2 | 8/2010 | Naden et al. |
| 7,795,851 B2 | 9/2010 | Ye et al. |
| 7,855,871 B2 | 12/2010 | Hudgins, Jr. et al. |
| 7,948,117 B2 | 5/2011 | Lathrop et al. |
| 8,009,039 B2 | 8/2011 | Fallin et al. |
| 8,027,180 B2 | 9/2011 | Nakagawa |
| 8,032,233 B2 | 10/2011 | Forbes et al. |
| 8,065,050 B2 | 11/2011 | West et al. |
| 8,140,414 B2 | 3/2012 | O'neil et al. |
| 8,169,755 B2 | 5/2012 | Sugita |
| 8,205,594 B2 | 6/2012 | Fore et al. |
| 8,237,300 B2 | 8/2012 | Allen |
| 8,288,890 B2 | 10/2012 | Young |
| 8,417,391 B1 * | 4/2013 | Rombouts et al. ............ 700/291 |
| 8,676,390 B2 * | 3/2014 | Berry, Jr. ............ G05B 19/4188 700/20 |
| 8,736,090 B2 | 5/2014 | Riihimäki |
| 8,942,854 B2 | 1/2015 | Mauk et al. |
| 9,281,716 B2 | 3/2016 | Albsmeier et al. |
| 2001/0005894 A1 * | 6/2001 | Fukui ............................ 713/310 |
| 2002/0033020 A1 | 3/2002 | Tonomura et al. |
| 2002/0079741 A1 * | 6/2002 | Anderson ....................... 307/64 |
| 2002/0111905 A1 | 8/2002 | Nagafuchi et al. |
| 2002/0190576 A1 | 12/2002 | Kern et al. |
| 2003/0023888 A1 | 1/2003 | Smith et al. |
| 2003/0075982 A1 | 4/2003 | Seefeldt |
| 2003/0107349 A1 | 6/2003 | Haydock et al. |
| 2003/0157928 A1 | 8/2003 | Phillips |
| 2004/0051515 A1 | 3/2004 | Ikekame |
| 2004/0052044 A1 | 3/2004 | Mochizuki et al. |
| 2004/0075343 A1 | 4/2004 | Wareham et al. |
| 2004/0095237 A1 | 5/2004 | Chen et al. |
| 2004/0199297 A1 | 10/2004 | Schaper et al. |
| 2004/0243525 A1 | 12/2004 | Forrester |
| 2005/0024905 A1 | 2/2005 | Shiojima |
| 2005/0059373 A1 | 3/2005 | Nakamura et al. |
| 2005/0063117 A1 | 3/2005 | Amano et al. |
| 2005/0072220 A1 | 4/2005 | Staphanos et al. |
| 2005/0099131 A1 | 5/2005 | Amarillas et al. |
| 2005/0105399 A1 * | 5/2005 | Strumpf et al. .................. 368/47 |
| 2005/0116814 A1 | 6/2005 | Rodgers et al. |
| 2005/0125519 A1 | 6/2005 | Yang et al. |
| 2005/0128659 A1 | 6/2005 | Hibi et al. |
| 2005/0141154 A1 | 6/2005 | Consadori et al. |
| 2005/0188745 A1 | 9/2005 | Staphanos et al. |
| 2005/0216131 A1 | 9/2005 | Sodemann et al. |
| 2005/0268164 A1 | 12/2005 | Hara |
| 2006/0022950 A1 | 2/2006 | Friedrichs, IV |
| 2006/0028069 A1 | 2/2006 | Loucks et al. |
| 2006/0129798 A1 | 6/2006 | Bance et al. |
| 2006/0146488 A1 | 7/2006 | Kimmel |
| 2006/0187600 A1 | 8/2006 | Brown et al. |
| 2006/0203814 A1 | 9/2006 | Ye et al. |
| 2006/0284843 A1 | 12/2006 | Endou et al. |
| 2007/0010916 A1 | 1/2007 | Rodgers et al. |
| 2007/0094131 A1 | 4/2007 | Wymore et al. |
| 2007/0120538 A1 | 5/2007 | Sato |
| 2007/0129851 A1 | 6/2007 | Rossi et al. |
| 2007/0222294 A1 | 9/2007 | Tsukida et al. |
| 2007/0222295 A1 | 9/2007 | Wareham |
| 2007/0241739 A1 | 10/2007 | Uenou et al. |
| 2007/0266423 A1 | 11/2007 | Tehee |
| 2007/0279203 A1 * | 12/2007 | Thomas ................ B60C 23/068 340/447 |
| 2008/0086394 A1 | 4/2008 | O'neil et al. |
| 2008/0091626 A1 | 4/2008 | Kremen |
| 2008/0150360 A1 | 6/2008 | Vezza et al. |
| 2008/0157593 A1 | 7/2008 | Bax et al. |
| 2008/0157600 A1 | 7/2008 | Marlenee et al. |
| 2008/0179958 A1 | 7/2008 | Lathrop et al. |
| 2008/0211455 A1 | 9/2008 | Park et al. |
| 2008/0313006 A1 | 12/2008 | Witter et al. |
| 2009/0108678 A1 | 4/2009 | Algrain |
| 2009/0113874 A1 | 5/2009 | McKee |
| 2009/0152951 A1 | 6/2009 | Algrain |
| 2009/0179498 A1 | 7/2009 | Lathrop et al. |
| 2009/0195224 A1 | 8/2009 | Kim |
| 2009/0198386 A1 | 8/2009 | Kim et al. |
| 2009/0216386 A1 | 8/2009 | Wedel |

(56) References Cited

U.S. PATENT DOCUMENTS

| | | | |
|---|---|---|---|
| 2009/0240377 A1 | 9/2009 | Batzler et al. | |
| 2009/0290270 A1 | 11/2009 | Ganev et al. | |
| 2010/0007313 A1 | 1/2010 | Jakeman et al. | |
| 2010/0019574 A1 | 1/2010 | Baldassarre et al. | |
| 2010/0038966 A1 | 2/2010 | Espeut, Jr. | |
| 2010/0039077 A1 | 2/2010 | Dalby | |
| 2010/0066551 A1 | 3/2010 | Bailey et al. | |
| 2010/0070785 A1 | 3/2010 | Fallin | |
| 2010/0094475 A1 | 4/2010 | Masters et al. | |
| 2010/0102637 A1 | 4/2010 | Dozier et al. | |
| 2010/0109344 A1 | 5/2010 | Conway et al. | |
| 2010/0114394 A1 | 5/2010 | Kobayashi et al. | |
| 2010/0148588 A1 | 6/2010 | Algrain | |
| 2010/0156117 A1 | 6/2010 | Allen | |
| 2010/0156191 A1 | 6/2010 | Dozier et al. | |
| 2010/0179893 A1 | 7/2010 | Burke et al. | |
| 2010/0181177 A1 | 7/2010 | Young | |
| 2010/0225167 A1 | 9/2010 | Stair et al. | |
| 2010/0253140 A1 | 10/2010 | Yamashita | |
| 2010/0288326 A1 | 11/2010 | Schroeder | |
| 2011/0017717 A1 | 1/2011 | Farah et al. | |
| 2011/0068631 A1 | 3/2011 | Roscoe | |
| 2011/0109291 A1 | 5/2011 | Tang et al. | |
| 2011/0148360 A1 | 6/2011 | Lee | |
| 2011/0173470 A1 | 7/2011 | Tran | |
| 2011/0175450 A1 | 7/2011 | Vicari et al. | |
| 2011/0175742 A1 | 7/2011 | Shin et al. | |
| 2011/0254370 A1 | 10/2011 | Wischstadt et al. | |
| 2011/0278921 A1* | 11/2011 | Fretheim | H02J 3/38 307/24 |
| 2011/0291411 A1 | 12/2011 | Folken | |
| 2011/0291483 A1 | 12/2011 | Yamane et al. | |
| 2011/0296169 A1 | 12/2011 | Palmer | |
| 2011/0298285 A1 | 12/2011 | Lim et al. | |
| 2011/0298286 A1 | 12/2011 | Batzler et al. | |
| 2011/0314144 A1 | 12/2011 | Goodman | |
| 2012/0053884 A1 | 3/2012 | Batzler et al. | |
| 2012/0090966 A1 | 4/2012 | Lathrop | |
| 2012/0179547 A1* | 7/2012 | Besore et al. | 705/14.58 |
| 2012/0217315 A1* | 8/2012 | Witbeck et al. | 236/51 |
| 2012/0242451 A1 | 9/2012 | Tanaka et al. | |
| 2012/0256483 A1 | 10/2012 | Nakashima et al. | |
| 2013/0018843 A1* | 1/2013 | Bultman et al. | 707/609 |
| 2013/0079943 A1 | 3/2013 | Darden et al. | |
| 2013/0106190 A1 | 5/2013 | Lin et al. | |
| 2013/0147412 A1 | 6/2013 | Solodovnik et al. | |
| 2013/0154370 A1 | 6/2013 | Albsmeier et al. | |
| 2013/0158726 A1 | 6/2013 | Mauk | |
| 2014/0001873 A1 | 1/2014 | Tian et al. | |

FOREIGN PATENT DOCUMENTS

| | | |
|---|---|---|
| CN | 101802735 A | 8/2010 |
| CN | 202055923 U | 11/2011 |
| WO | WO-2007136579 A2 | 11/2007 |
| WO | WO-2009039155 A2 | 3/2009 |
| WO | WO2011/027195 A1 | 3/2011 |
| WO | WO-2011/085477 A1 | 7/2011 |
| WO | WO-2013/096307 A1 | 6/2013 |

OTHER PUBLICATIONS

"International Application Serial No. PCT/US2012/070337, International Preliminary Report on Patentability dated Jul. 3, 2014", 7 pgs.

"International Application Serial No. PCT/US2012/070337, International Search Report dated Apr. 23, 2013", 5 pgs.

"International Application Serial No. PCT/US2012/070337, Invitation to Pay Additional Fees and Partial Search Report dated Feb. 8, 2013", 2 pgs.

"International Application Serial No. PCT/US2012/070337, Written Opinion dated Apr. 23, 2013", 5 pgs.

"U.S. Appl. No. 13/663,847, Final Office Action dated Oct. 23, 2015", 8 pgs.

"U.S. Appl. No. 13/736,998, Examiner Interview Summary dated Oct. 26, 2015", 4 pgs.

"U.S. Appl. No. 13/736,998, Notice of Allowance dated Nov. 6, 2015", 9 pgs.

"U.S. Appl. No. 13/736,998, Response filed Oct. 12, 2015 to Non Final Office Action dated Jul. 16, 2015", 9 pgs.

"U.S. Appl. No. 13/736,998, Non Final Office Action dated Jan. 9, 2015", 20 pgs.

"U.S. Appl. No. 13/663,847, Non Final Office Action dated Apr. 3, 2015", 8 pgs.

"U.S. Appl. No. 13/663,847, Response filed Jun. 29, 2015 to Non Final Office Action dated Apr. 3, 2015", 9 pgs.

"U.S. Appl. No. 13/736,998, Non Final Office Action dated Jul. 16, 2015", 29 pgs.

"U.S. Appl. No. 13/736,998, Response filed Apr. 17, 2015 to Non Final Office Action dated Jan. 9, 2015", 8 pgs.

"European Application No. 13188723.4, Extended European Search Report dated Mar. 27, 2014", 5 pgs.

"U.S. Appl. No. 13/663,847, Non Final Office Action dated Apr. 19, 2016", 10 pgs.

"U.S. Appl. No. 13/663,847, Response filed Dec. 21, 2015 to Final Office Action dated Oct. 23, 2015", 7 pgs.

"U.S. Appl. No. 13/663,847, Response filed Jun. 30, 2016 to Non Final Office Action dated Apr. 19, 2016", 8 pgs.

"Chinese Application No. 201280062992.X, First Office Action dated Apr. 6, 2016", w/ English Summary, 11 pgs.

"Chinese Application Serial No. 201310478341.5, First Office Action dated Dec. 30, 2015", w/ English Summary, 13 pgs.

"European Application Serial No. 12858787.0, Extended European Search Report dated May 30, 2016", 8 pgs.

"European Application Serial No. 13001988.8, Communication pursuant to Article 94(3) EPC mailed Mar. 21, 2016", 4 pgs.

"European Patent Office Action No. 13 188 723.4, Communication pursuant to Article 94(3) EPC dated Jul. 14, 2015", 3 pgs.

"U.S. Appl. No. 13/663,847, Final Office Action dated Sep. 27, 2016", 12 pgs.

"U.S. Appl. No. 13/663,847, Response filed Nov. 15, 2016 to Final Office Action dated Sep. 27, 2016", 9 pgs.

"Chinese Application No. 201280062992.X, Office Action dated Oct. 17, 2016", w/ English Translation, (Oct. 17, 2016), 11 pgs.

"Chinese Application No. 201310478341.5, Office Action dated Dec. 1, 2016", w/ English Summary, (Dec. 1, 2016), 4 pgs.

"Chinese Application Serial No. 201310478341.5, Second Office Action dated Jul. 26, 2016", w/ English Translation, (Jul. 26, 2016), 12 pgs.

"U.S. Appl. No. 13/663,847, Non Final Office Action dated Feb. 10, 2017", 11 pgs.

"U.S. Appl. No. 13/663,847, Response filed Mar. 24, 2017 to Non Final Office Action dated Feb. 10, 2017", 9 pgs.

"U.S. Appl. No. 13/663,847, Final Office Action dated Jun. 26, 2017", 14 pgs.

"Chinese Application No. 201280062992.X, Office Action dated Apr. 5, 2017", w/ English Summary, (Apr. 5, 2017), 12 pgs.

* cited by examiner

SYSTEM AND METHOD FOR USING A NETWORK TO CONTROL A POWER MANAGEMENT SYSTEM

CLAIM OF PRIORITY

This patent application claims the benefit of priority, under 35 U.S.C. §119(e), to U.S. Provisional Patent Application Ser. No. 61/577,816, entitled "SYSTEM AND METHOD FOR USING A NETWORK TO CONTROL A POWER MANAGEMENT SYSTEM," filed on Dec. 20, 2011, which is hereby incorporated by reference herein in its entirety.

TECHNICAL FIELD

Embodiments pertain to a system and method for controlling a power management system, and more particularly to system and method for using a network to control a power management system.

BACKGROUND

Some existing power management systems are able to control a power management system using a network. These existing systems typically require elaborate hardware systems and/or extensive highly technical programming in order to control the electronic components that make up the power management systems. These requirements add unwanted expenses that are usually associated with operating and/or installing the power management systems.

It should be noted many existing power management systems require entry of multiple parameters in order adequately operate the electronic components that make up the power management system. These parameters also typically need to be changed each time there is change within the power management system.

In addition, existing power management systems often require a separate device in order to have a user remotely communicate with the electronic components within the power management system. These additional and separate devices add unwanted time and cost to the power management system (both hardware and installation). These additional devices also add security risks associated with remotely accessing the electronic components in the power management system.

Another drawback with such existing power management systems is that it is typically more difficult to establish and maintain a remote connection. This difficulty is commonly due to local network security requirements pertaining to inbound network connections within the power management system.

Conventional power management systems sometimes use a server on a network to control power management systems. However, even though these systems may be able to access a generator controller that is part of the power management system in order to exchange communications between the server and the generator controller, the generator controller in such power management systems are unable to control other electronic components (e.g., automatic transfer switches, load control modules, etc.) that are part of the power management systems.

In addition, conventional power management systems do not include the ability to use the network to update programming on the generator controller. Therefore, the generator controller is unable to control other electronic components that are part of the power management system using the updated programming unless the programming is added to the generator control (or the other electronic components that make up the power management system via the generator controller) in some other more cumbersome manner.

Conventional power management systems also do not include the ability to use the server on the network to synchronize a server clock with a generator controller clock. Therefore, existing power management systems are unable to use a synchronized generator controller clock to synchronize the clocks in the other electronic components that are part of the power management system.

DETAILED DESCRIPTION

Figure 1:
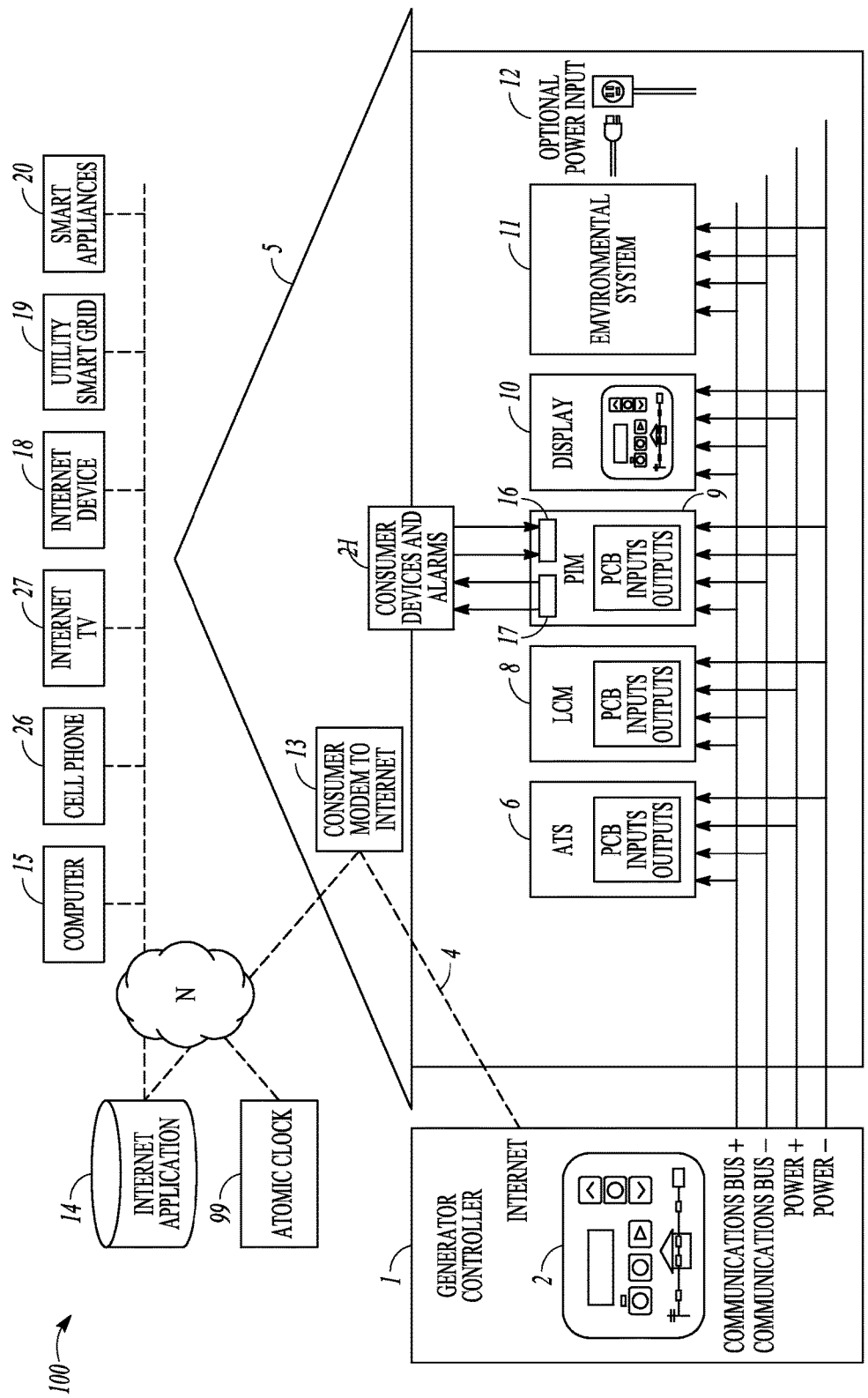
FIG. 1 illustrates a schematic diagram of an example power management system where the electronic devices that are included in the power management system are generically labeled.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A method of using a network N to control a power generating and management system 100 will now be described with reference to FIGS. 1 and 2. The method includes using the network N to access a generator controller 1 that is part of the power generating and management system 100. The method further includes using the network N to exchange communications with the generator controller 1 in order to permit the generator controller 1 to control other electronic components that are part of the power generating and management system 100.

In some embodiments, one type of electronic component that may form part of the power management system 100 is an automatic transfer switch 6. The type of and functionality of the automatic transfer switch 6 that is used in the power management system 100 will depend in part on the overall design of power management system 100.

Another type of electronic component that may form part of the power management system 100 is a load control module 8. The type and functionality of the load control module 8 that is used in the power management system 100 will depend in part on the overall design of power management system 100. As an example, the load control module 8 may add and/or shed various loads that are part of the power management system 100. In some embodiments, the load control module 8 may add and/or sheds loads according to conditions related to the operation of the power management system 100.

Yet another type of electronic component that may form part of the power management system 100 is an environmental monitoring system 11. The type and functionality of the environmental monitoring system 11 that is used in the power management system 100 will depend in part on the overall design of power management system 100.

As an example, the environmental monitoring system 11 may monitor temperature, humidity, wind, sunlight and precipitation. In addition, the environmental monitoring system 11 may monitor the existence of any weather alerts that occur in the location where the power management system 100 is located.

The environmental monitoring system 11 may also monitor the existence of any safety alerts that occur in the location where the power management system 100 is located (e.g., earthquakes, fires, floods, etc.). In addition, the environmental monitoring system 11 may also monitor whether there is any power outages in the location where the power management system 100 is located.

If the generator controller receives an indication as to the existence of any of the conditions described above (plus others not listed), the generator controller 1 may then operate the electronic components that make up the power management system in some prescribed manner. As an example, the generator controller 1 may exercise and/or operate the generator 200 when there is a severe weather alert.

In still other embodiments, the power generating and management system 100 may include one or more load switching and sensor modules 9. The load switching and sensor module 9 may include various sensor inputs 16 and power switching outputs 17 that exchange signals and/or power with a variety of devices and/or alarms 21. The type and functionality of the sensor inputs 16 and power switching outputs 17 that are used in the load switching and sensor module 9 will depend in part on (i) the overall design of power generating and management system 100; and (ii) the types of consumer devices and/or alarms 21 that are included in the power generating and management system 100.

As an example, one of the devices 21 may be a sensor system that detects temperature, sunlight and/or time of day. The sensor sends signals to the sensor inputs 16 within the load switching and sensor module 9. The load switching and sensor module 9 then delivers signals to the generator controller 1.

Based upon the signals that are received from the sensor input 16, the generator controller sends a certain type of signal to the switching outputs 17. The switching outputs 17 may then operate sprinklers (i.e., another type of device 21) based on the switching outputs 17. It should be noted that the devices 21 that may be used in the power management system 100, and the applications where the generator controller 1 sends and receives from the load switching and sensor modules 9 is meant to includes any applications and/or devices that are known now or discovered in the future.

Figure 2:
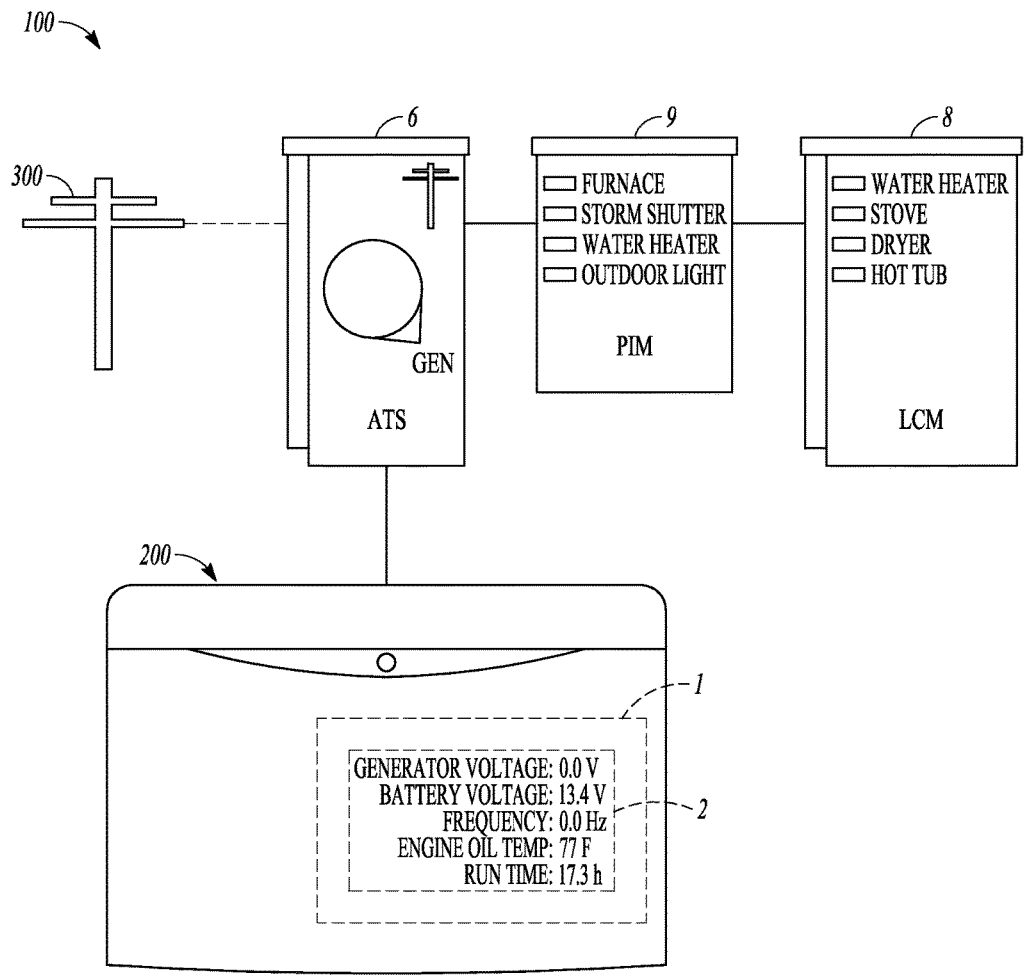
FIG. 2 illustrates a schematic diagram of example user interface information that may be used in a display that is part of the power management system shown in FIG. 1.

In the example embodiments that are illustrated in FIGS. 1 and 2, using the network N to access a generator controller 1 that is part of the power management system 100 includes connecting to the network N with an electronic device. As an example, connecting to the network N with an electronic device may include connecting to the network N with a personal computer 15.

Embodiments are also contemplated where connecting to the network N with an electronic device includes connecting to the network N with a home automation controller 19 and/or some form of smart appliance 20. It should be noted that connecting to the network N with an electronic device may further include connecting to the network N with an internet TV 27 or some other form of Internet device 18 that is known now or developed in the future.

In some embodiments, connecting to the network N with an electronic device includes connecting to the network N with a portable electronic device. Some example portable electronic devices include mobile phones 26 and tablets (not shown).

Embodiments are also contemplated where using the network N to access the generator controller 1 that is part of the power management system 100 includes maintaining a connection between the network N and the generator controller 1. It should be noted that the connection between the network N and the generator controller 1 may be maintained all of time or periodically depending on the functionality of the power management system 100.

In some embodiments, using the network N to access a generator controller 1 that is part of the power management system 100 includes using a server 14 on the network N to access the generator controller 1. The type of server 14 that is utilized to access the generator controller 1 will depend in part on (i) the type of generator controller 1 that is used in the power management system 100; (ii) the number and type of electronic components that are used in the power management system 100; and/or (iii) the operations that must be performed by the power management system 100.

It should be noted that using the server 14 on the network N to access the generator controller 1 may include (i) maintaining a connection between the server 14 and the generator controller 1 (as generically described above); and/or (ii) gathering data on the server 14 relating to the connection between the server 14 and the generator controller 1.

In some embodiments, using the server 14 on the network N to access the generator controller 1 includes gathering data on the server 14 from the generator controller 1 relating to the operation of the other electronic components in the power management system 100. The types of data that may be collected on the server 14 will depend in parts on the type and number of electronic components that are included in the power management system 100. As an example, the server 14 may collect data from the generator controller 1 related to the operation of the generator 200 (e.g., past and present voltage and frequency data) that is part of the power management system 100.

In addition, as generically discussed above, using a server 14 on the network N to access the generator controller 1 may include connecting to the server 14 on the network N with an electronic device. It should be noted that connecting to the server on the network N with an electronic device may include using programming on the server 14 that is designated for a particular electronic device (i.e., certain applications for certain devices). As an example, the electronic device may be a mobile phone 26 such that connecting to the server 14 on the network N with the mobile phone 26 includes using programming on the server 14 that is designated for the mobile phone 26.

In some embodiments, using a server 14 on the network N to access the generator controller 1 includes using an electronic device (similar to one of the electronic devices discussed above) to exchange data with the server 14. It should be noted that using an electronic device to exchange data with the server may include using programming on the electronic device to exchange data with the server 14 (i.e., the electronic device may include certain applications for certain servers). As an example, the electronic device may be a mobile phone 26 such that connecting to the server 14 on the network N with the mobile phone 26 includes using specialized programming on the mobile phone 26 that is designated for the server 14.

In some embodiments, the method further includes preventing unauthorized access to the generator controller 1. It should be noted that preventing unauthorized access to the generator controller 1 may include using programming on a server 14 that is connected to the generator controller 1 to prevent unauthorized access to the generator controller 1.

As an example, preventing unauthorized access to the generator controller 1 may include requiring identification to permit access to the generator controller 1. In some embodiments, the generator controller 1 may include a generator display 2 that provides access to the generator controller 1 and the server 14. Access to the generator controller 1 and/or the server 14 (or any other components in the power management system 100) may be limited unless identification is entered into the generator display 2.

As an example, the power management system 100 may utilize encryption, passwords or any other security measure that is known now or developed in the future. The type of security measures that are utilized in the power management system 100 will depend in part on (i) the type and number of components 13 that are connected to the network N; and/or (ii) the identity and purpose of a user attempting to access the power management system (among other factors).

As another example, the power management system 100 may include one or more other additional displays 10 that provide access to the generator controller 1 and server 14. As discussed above with regard to generator display 2, access to the generator controller 1 and/or the server 14 (or any other components in the power management system 100) may be limited unless identification is entered in to the display 10.

Embodiments are also contemplated where using an electronic device to exchange data with the server 14 includes displaying information on the electronic device relating to operation of the power management system 100. In some embodiments, displaying information on the electronic device relating to operation of the power management system 100 may include displaying alphanumeric information relating to operation of the power management system 100. In other embodiments, displaying information on the electronic device relating to operation of the power management system 100 may include displaying illustrations (e.g., static graphics, moving graphics and videos among others) relating to operation of the power management system 100. In still other embodiments, displaying information on the electronic device relating to operation of the power management system 100 may include providing audio information relating to operation of the power management system 100.

Embodiments are also contemplated where displaying information on the electronic device relating to operation of the power management system 100 includes displaying power that is available to the power management system 100. As an example, displaying power that is available to the power management system 100 may include displaying power that is available from a generator 200 (and/or a primary power source such as a utility 300) in the power management system 100.

In some embodiments, displaying information on the electronic device relating to operation of the power management system 100 may include displaying each of the electronic components in the power management system 100. As an example, displaying each electronic component in the power management system 100 may include displaying data relating to the operation of each electronic component in the power management system 100.

The types of information that are displayed on the electronic device will vary depending on (i) the type and capabilities of each electronic component in the power management system 100; (ii) the type and capabilities of the generator controller 1 in the power management system 100; and/or (iii) type and capabilities of the electronic device that is communicating with the server 14 (among other factors). In one example embodiment, displaying data relating to the operation of each electronic component includes displaying power that is being consumed by each electronic component in the power management system.

As an example with reference to FIG. 2, a user may select the button next to the "hot tub" description (or select the "hot tub" description itself). Once selected, data relating to operation of the hot tub may be shown for the benefit of the user. The type of data that is displayed will depend in part on the capabilities of one or more the (i) hot tub; (ii) load switching and sensor module 9; (iii) generator controller 1; (iv) server 14; and (v) device where the information is displayed (i.e., the generator display 2, additional display 10 or particular electronic device).

Embodiments are also contemplated where using an electronic device to exchange data with the server 14 includes using the electronic device to update programming on the generator controller 1. As an example, a user may utilize the electronic device to change programming within the generator controller 1 relating to exercising the generator 200.

As another example, a user may utilize the electronic device to change programming within the load control module 8 relating to changing a priority list associate with adding and shedding loads. The use may reorganize the manner in which loads are shed or added during generator overload and/or under load conditions.

In addition, using an electronic device to exchange data with the server 14 may include using the electronic device to update programming on one of the electronic components. The ability to update an electronic component programming within the power management system 100 via the server 14 will depend in part on the capability of the electronic component to accept programming changes (i.e., whether a particular electronic component is a "smart" electronic component).

As an example, the power management system 100 may include a water heater that has a control which includes programming to keep the water at a certain temperature. This programming could be changed to maintain the water at a different temperature, or change the temperature based on flow activity with the water heater.

In some embodiments, using an electronic device to exchange data with the server 14 includes using the electronic device to schedule operations within the power management system 100. The number and type of operations that may be scheduled with the electronic device will depend in part on (i) the number and type of electronic components that are included in the power management system 100; and (ii) the overall configuration of the power management system 100.

As an example, using the electronic device to schedule operations within the power management system 100 may include storing timing parameters within the server 14 relating to operations within the power management system 100. One example timing parameter may be related to the operation of a sprinkler system. Another example timing parameter may be related the operation of a home lighting system. Still another example timing parameter may be related to an exercising schedule for the generator 200.

Embodiments are also contemplated where using the electronic device to schedule operations within the power management system 100 includes activating at least one of the electronic components within the power management system 100. As an example, the electronic device may be used turn on a hot tub before arriving at a location where the hot tub is located in order to make sure the hot tub is functional (e.g., by heating the water in the hot tub) before arriving at the location.

In some embodiments, using the electronic device to schedule operations within the power management system 100 may include displaying calendar data to facilitate scheduling operations within the power management system 100. The arrangement and display of the calendar on the electronic device will depend in part on the number and types of electronic components that are included in the power management system 100 as well as the display capabilities of the particular electronic device(s) that are used to schedule operations within the power management system 100.

It should be noted that using an electronic device to exchange data with the server 14 may include adding programming to the electronic device that operates the power management system 100. The ability to add programming to the electronic device allows the electronic device to remain updated as there are changes/improvements to the rest of the power management system 100.

In other embodiments, using an electronic device to exchange data with the server 14 may include using the electronic device to add programming to the server 14. The ability to add programming to the electronic device allows the server 14 to remain updated as there are changes/improvements to the rest of the power management system 100.

Embodiments are also contemplated where using the electronic device to add programming to the server 14 includes (i) delivering the programming to the generator controller 1 via the server 14; and/or (ii) delivering the programming to the electric components via the server 14 and the generator controller 1. The ability to deliver programming to the generator controller 1 and/or to the electric components via the server 14 allows the generator controller 1 and/or electric components to remain updated as there are changes/improvements to the rest of the power management system 100.

The method may further include collecting data with the electronic components, wherein the programming on each electric component operates each electric component based on the data. As an example, one of the electronic components may be a lighting system that includes a sensor that senses when it is dark. Once the sensors detect darkness, the electronic component (i.e., the lighting system) operates lights within the lighting system according to predefined operating characteristics.

In other embodiments, programming on the generator controller operates the power management system 100 based on the data received from the sensor. Therefore, the control associated with the lighting system (or some other electronic component in the power management system 100) is located in the generator controller 1 instead of the lighting system.

In still other embodiments, programming on the server operates the power management system 100 based on the data received from the sensor. Therefore, the control associated with the lighting system (or some other electronic component in the power management system 100) is located in the server 14 instead of the lighting system or the generator controller 1.

In yet another embodiment, programming on the electronic device operates the power management system 100 based on the data received from the sensor. Therefore, the control associated with the lighting system (or some other electronic component in the power management system 100) is located in the electronic device instead of the lighting system, the generator controller 1 or the server 14.

The method may further include displaying information on the generator controller 1 relating to a connection status between the generator controller 1 and the network N. In some embodiments, the connection status between the generator controller 1 and the network N may be displayed on the generator display 2 and/or one or more remote displays 10.

It should be noted that displaying information on the generator controller 1 may include (i) displaying information relating to testing the connection between the generator controller 1 and the network N; and/or (ii) displaying information as to whether a connection to the network N is available for the generator controller 1. The testing of the network N connection, and/or determination of network N availability, may be done using any checking and/or testing procedure that are known now or discovered in the future.

The method may further include providing environmental data to the server 14 such that using the network N to exchange communications with the generator controller 1 may include delivering the environmental data to the generator controller 1. Based on the received environmental data, the generator controller 1 may operates the other electronic components that are part of the power management system 100.

In the illustrated example embodiment, providing environmental data to the server 14 includes using the network N to supply the environmental data to the server 14. As an example, based on environmental data that is provided to the generator controller 1 (e.g., notification of severe weather), the generator controller 1 may test the performance capabilities of an electronic component (e.g., generator 200) that is part of the power management system 100.

The method may further include using the network N to notify a user when certain types of environmental data are supplied to the generator controller 1. The determination as to whether to notify a user of certain types of environmental data will depend in part on (i) the type of electronic components that are used in the power management system 100; and (ii) the type of environmental data that is received by the generator controller 1 (among other factors).

In addition, the manner in which a user is notified may vary depending on the number and types of electronic devices that are included in the power generating and management system 100. As examples, an email message may be sent to computer 15 and/or a text message may be sent to mobile phone 26 when certain types of environmental data are received by the generator controller 1 (e.g. notification of an earthquake event).

The method may further include using the network N to notify a user of a changed condition within the power management system 100. In some embodiments, using the network N to notify a user of a changed condition within the power management system 100 includes using the network N to notify the user when one of the electronic components detects a particular condition.

As an example, using the network N to notify the user when one of the electronic components detects a particular condition may include using the network to notify the user when one of the electronic components detects carbon monoxide. It should be noted that the types of conditions that are detected within the power management system 100 will depend in part on the types of electronic components (e.g., sensors) that are included as part of the power management system 100.

In some embodiments, using the network N to notify a user of a changed condition within the power management system 100 may include using the network N to notify the user when one of the electronic components is deactivated/activated by the generator controller 1 (i.e., when the generator controller 1 performs a load shed/add operation). As an example using the network N to notify the user when one of the electronic components is deactivated by the generator controller 1 includes using the network N to notify the user when an air conditioner within the power management system is deactivated by the generator controller. The types of changed condition notifications that are supplied to the user will depend in part on the types of electronic components (i.e., loads) that are included in the power management system.

Embodiments are contemplated where the load control module 8 adds/sheds loads based on commands received from the generator controller 1. The generator controller 1 then notifies the user via the server 14 as to the status of each load. It should be noted that the generator controller may provide a report to the user relating to any load add/shed operations performed over a period of time (e.g., a day, week, month etc.).

In some embodiments, using the network N to notify the user when one of the electronic components is deactivated by the generator controller 1 may include using the network N to request a command from the user relating to deactivating the electric component. As an example, the generator controller 1 may send an inquiry to the user via the server 14 as to which load(s) to shed during a particular operating condition (e.g., when the generator 200 is exceeding recommended capacity).

Embodiments are also contemplated where using the network N to notify a user of a changed condition within the power management system 100 includes using the network N to provide a recommendation to the user relating to operation of the power management system 100. As an example, the generator controller 1 may send a recommendation to the user via the server 14 as to which load(s) to shed during a particular operating condition (e.g., when the generator 200 is exceeding recommended capacity).

In some embodiments, using the server 14 on the network N to exchange communications with the generator controller 1 may include synchronizing a server clock with a generator controller clock. As an example, synchronizing a server clock with a generator controller clock may includes using the network N to set the server clock (i.e., the server 14 may obtain a universal clock from some source that is also connected to the network). The method may further include synchronizing the generator controller clock with each clock in the other electronic components that form the power management system 100.

Embodiments are also contemplated where accessing the generator controller 1 using the server 14 includes creating a connection between the server 14 and generator controller 1. As an example, the generator controller 1 may store a predetermined address of the server 14 such that creating a connection between the server 14 and the generator controller 1 includes using the generator controller 1 to initiate the connection with the server 14 at the predetermined address.

It should be noted that the electronic devices that are included in the power management system 100 may also store a predetermined address of the server 14 such that the electronic devices are able to initiate a connection with the server 14 (and therefore any other part of the power management system 100) at the predetermined address. As an example, creating a connection between the server 14 and generator controller 1 may include using the electronic device to provide a serial number of the generator controller 1 to the server 14. In embodiments where the electronic device is used to provide a serial number of the generator controller 1 to the server 14, the server 14 may include a database that correlates the serial number of the generator controller 1 with a network address of the generator controller 1.

The methods described herein may permit improved control of the electronic components that are included in a power management system 100. The control may be exercised in a more efficient manner than is done with existing power management systems.

The methods may also allow a user to be readily informed as to the operation of the power management system. In addition, the methods may also provide a user with (i) recommendations relating to operation of the power management system; and/or (ii) inquiries that ask to how to operate the power management system 100 based on certain conditions.

The methods described herein may also permit a user to be notified of certain conditions that occur which can affect the operation of the power management system 100. In addition, the methods may also allow programming on the different devices that make up the power management system to be updated.

Example Machine Architecture

Figure 3:
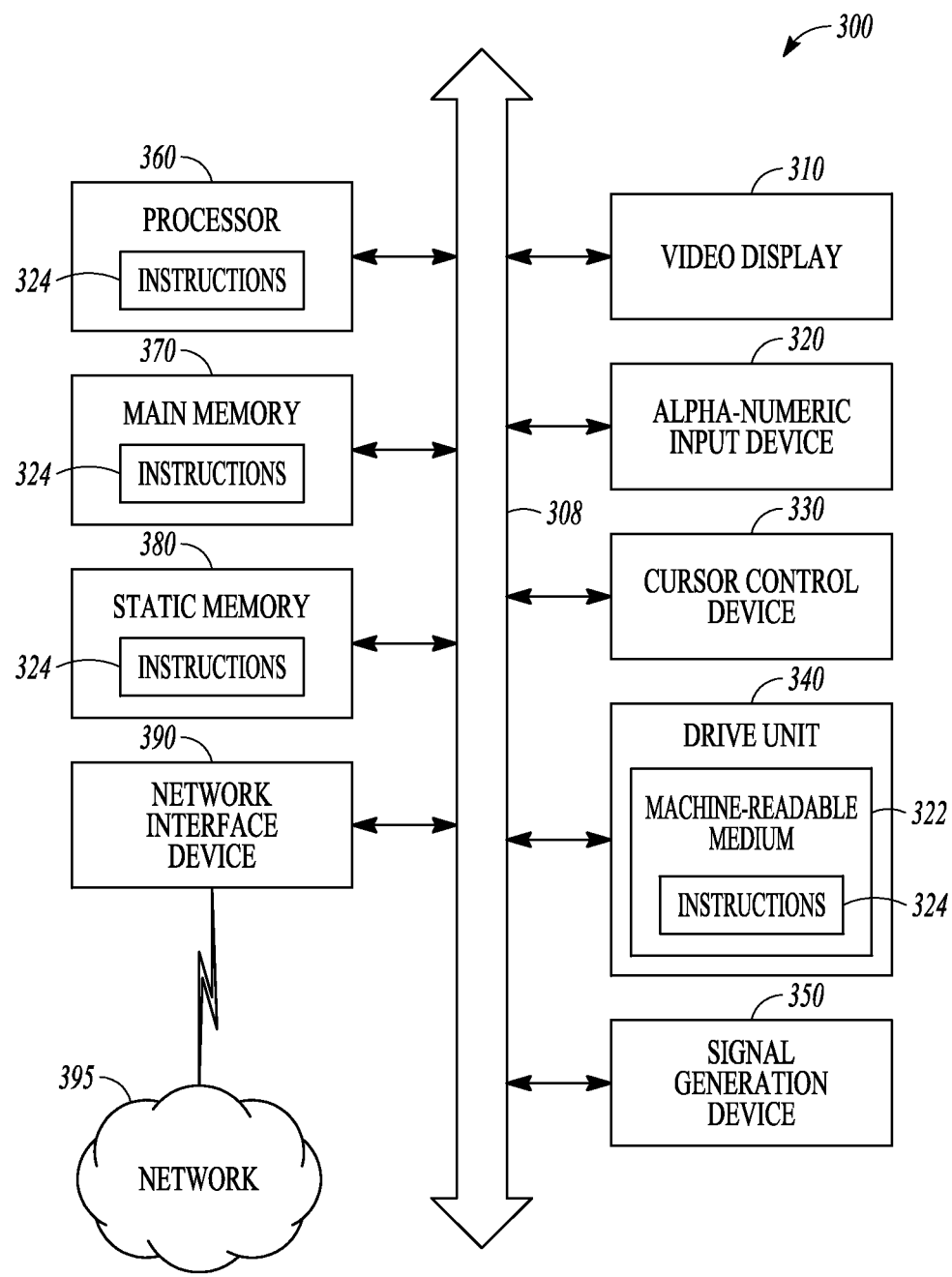
FIG. 3 is a block diagram that illustrates a diagrammatic representation of a machine in the example form of a computer system within which a set of instructions for causing the machine to perform any one or more of the methodologies discussed herein may be executed.

FIG. 3 is a block diagram that illustrates a diagrammatic representation of a machine in the example form of a computer system 300 within which a set of instructions for causing the machine to perform any one or more of the methodologies discussed herein may be executed. In some embodiments, the computer system 300 may operate in the capacity of a server (e.g., server 14 or generator controller 1) or a client machine (e.g., electronic devices in power management system 100) in a server-client network environment, or as a peer machine in a peer-to-peer (or distributed) network environment (or any combination of the above as shown with respect power management system 100).

The computer system 300 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 360 (e.g., a central processing unit (CPU), a graphics processing unit (GPU) or both), a main memory 370 and a static memory 380, all of which communicate with each other via a bus 308. The computer system 300 may further include a video display unit 310 (e.g., liquid crystal displays (LCD) or cathode ray tube (CRT)). The computer system 300 also may include an alphanumeric input device 320 (e.g., a keyboard), a cursor control device 330 (e.g., a mouse), a disk drive unit 340, a signal generation device 350 (e.g., a speaker), and a network interface device 390.

The disk drive unit 340 may include a machine-readable medium 322 on which is stored one or more sets of instructions (e.g., software 324) embodying any one or more of the methodologies or functions described herein. The software 324 may also reside, completely or at least partially, within the main memory 370 and/or within the processor 360 during execution thereof by the computer system 300, the main memory 370 and the processor 360 also constituting machine-readable media. It should be noted that the software 324 may further be transmitted or received over a network (e.g., network N in FIG. 1) via the network interface device 390.

In some embodiments, the software may reside partially, or wholly, with the one or more of the device that make up the power management system 100. As an example, the electronic devices may include some of the software; the server 14 may also include more of the software; the generator controller 1 may include yet more of the software and the various electronic components even more of the software.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of example embodiments described herein. The term "machine-readable medium" shall accordingly be taken to include, but not be limited to, solid-state memories and optical and magnetic media.

Thus, a computerized method and system are described herein. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Figure 4:
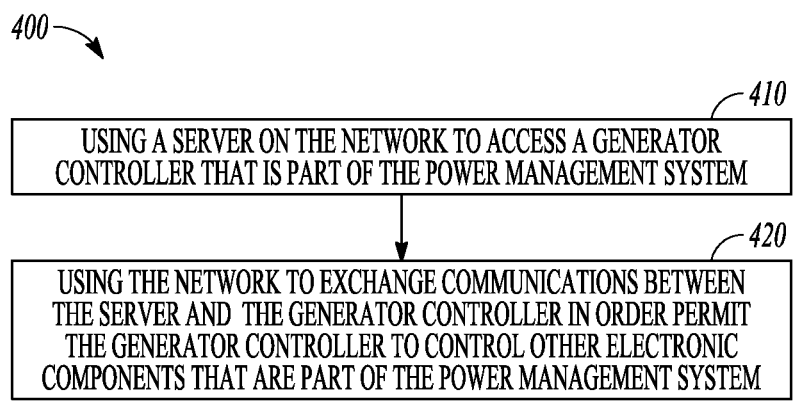
FIG. 4 is a flow diagram illustrating a method of using a network to control a power management system.

Referring now also to FIG. 4, a method [400] of using a network N to control a power generating and management system 100 will now be described. The method includes [410] using a server 14 on the network N to access a generator controller 1 that is part of the power generating and management system 100. The method [400] further includes [420] using the network N to exchange communications between the server 14 and the generator controller 1 in order to permit the generator controller 1 to control other electronic components that are part of the power generating and management system 100.

As examples, the other electronic components may include an automatic transfer switch 6, a load control module 8 and devices 9 that include sensor inputs 16 and power switching outputs 17.

In some embodiments, [410] using a server 14 on the network N to access a generator controller 1 that is part of the power management system 100 may include (i) connecting to the server 14 with an electronic device (see, e.g., electronic devices discussed above); and (ii) maintaining a connection between the server 14 and the generator controller 1.

Embodiments are also contemplated where [410] using a server 14 on the network N to access the generator controller 1 includes gathering data on the server 14 from the generator controller 1 relating to the operation of the other electronic components in the power management system 100. As an example, using a server 14 on the network N to access the generator controller 1 may include using the generator controller 1 to schedule operations within the power management system 100 based on the data gathered on the server 14. In addition, using the generator controller 1 to schedule operations within the power management system 100 based on the data gathered on the server 14 may include storing timing parameters within the server 14 relating to operation of the other electronic components that are part of the power management system 100 and using the generator controller 1 to operate the other electronic components utilizing the timing parameters.

In some embodiments, using the generator controller 1 to schedule operations within the power management system 100 may include activating at least one of the electronic components within the power management system 100. In addition, using the generator controller 1 to schedule operations within the power management system 100 may include collecting sensor data from at least one of the electronic components within the power management system 100.

Figure 5:
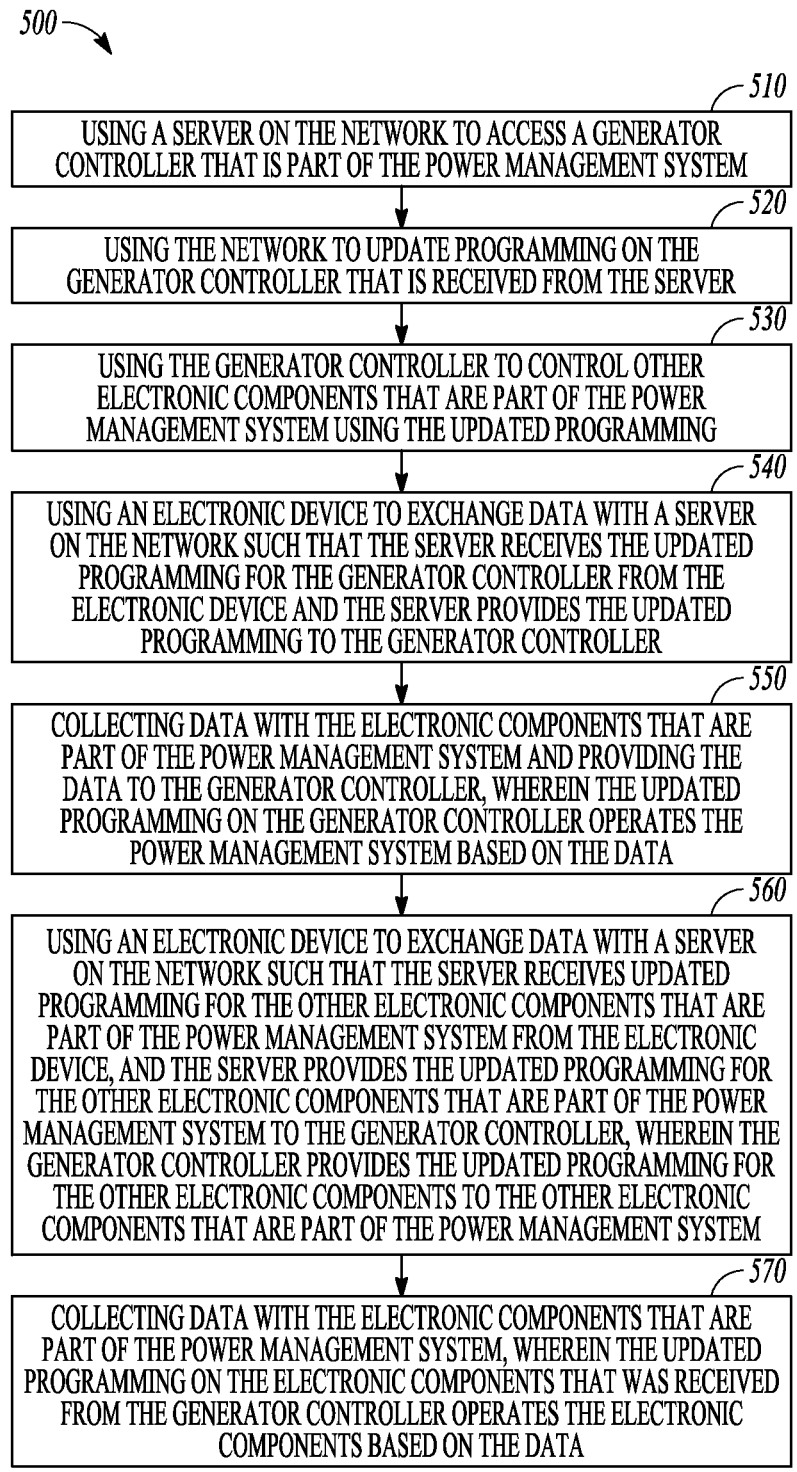
FIG. 5 is a flow diagram illustrating another method of using a network to control a power management system.

Referring now also to FIG. 5, a method [500] of using a network N to control a power management system 100 will now be described. The method includes [510] using a server 14 on the network N to access a generator controller 1 that is part of the power management system 100 and [520] using the network N to update programming on the generator controller 1 that is received from the server 14. The method [500] further includes [530] using the generator controller 1 to control other electronic components that are part of the power management system 100 using the updated programming.

As examples, the other electronic components may include an automatic transfer switch 6, a load control module 8 and devices 9 that include sensor inputs 16 and power switching outputs 17.

The method [500] may further include [540] using an electronic device (see, e.g., electronic devices discussed above) to exchange data with a server 14 on the network N such that the server 14 receives the updated programming for the generator controller 1 from the electronic device and the server 14 provides the updated programming to the generator controller 1. In addition, the method [500] may further include [550] collecting data with the electronic components that are part of the power management system 100 and providing the data to the generator controller 1, wherein the updated programming on the generator controller 1 operates the power management system 100 based on the data.

In some embodiments, the method [500] may further include [560] using an electronic device to exchange data with a server 14 on the network N such that the server 14 receives updated programming for the other electronic components that are part of the power management system 100 from the electronic device. The server 14 provides the updated programming for the other electronic components that are part of the power management system 100 to the generator controller 1. In addition, the generator controller 1 provides the updated programming for the other electronic components to the other electronic components that are part of the power management system 100.

Embodiments are also contemplated where the method [500] further includes [570] collecting data with the electronic components that are part of the power management system 100 such that the updated programming on the electronic components that was received from the generator controller 1 operates the electronic components based on the data.

Figure 6:
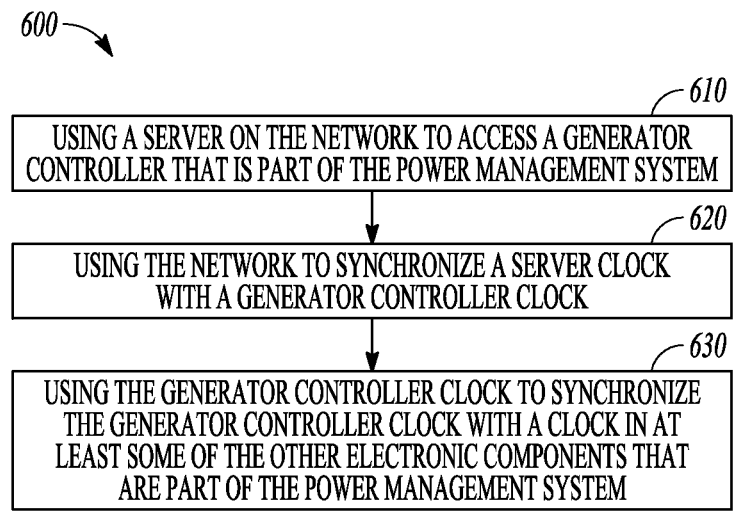
FIG. 6 is a flow diagram illustrating still another method of using a network to control a power management system.

Referring now also to FIG. 6, another example method [600] of using a network N to control a power management system 100 will now be described. The method includes [610] using a server 14 on the network N to access a generator controller 1 that is part of the power management system 100 and [620] using the network N to synchronize a server 14 clock with a generator controller 1 clock.

As examples, the other electronic components may include an automatic transfer switch 6, a load control module 8 and devices 9 that include sensor inputs 16 and power switching outputs 17.

In some embodiments, the method [600] may further include [630] using the generator controller 1 clock to synchronize the generator controller 1 clock with a clock in at least some of the other electronic components that are part of the power management system 100. It should be noted that the determination as to whether to synchronize the generator controller 1 clock with a clock in a particular electronic component that is part of the power management system 100 will depend in part on (i) the overall design of the power management system 100; and (ii) the operating characteristics of the particular electronic component.

Embodiments are also contemplated where [620] using the network N to synchronize a server 14 clock with a generator controller 1 clock includes using the network N to set the server 14 clock. As shown in FIG. 1, the server 14 clock may be synchronized with some form of atomic clock 99 that is connected to the network N. It should be noted that any type of atomic clock 99 (or standardized clock) may be utilized without departing from the scope of the invention.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of using a network to control a power generating and management system, the method comprising:
   using a server on the network to access a generator controller that is part of the power generating and management system, wherein the generator controller is configured to operate a generator that produces power; and
   using the network to exchange communications between the server and the generator controller in order to permit the generator controller to control other electronic components that are part of the power generating and management system, wherein the server provides updated programming for the other electronic components that are part of the power generating and management system to the generator controller, wherein the generator controller provides the updated programming for the other electronic components to the other electronic components that are part of the power generating and management system.

2. The method of claim 1, wherein the other electronic components includes an automatic transfer switch.

3. The method of claim 1, wherein the other electronic components includes a load control module.

4. The method of claim 1, wherein the other electronic components includes sensor inputs and power switching outputs.

5. The method of claim 1, wherein using a server on the network to access a generator controller that is part of the power management system includes connecting to the server with an electronic device.

6. The method of claim 1, wherein using a server on the network to access a generator controller that is part of the power generating and management system includes maintaining a connection between the server and the generator controller.

7. The method of claim 1, wherein using a server on the network to access the generator controller includes gathering data on the server from the generator controller relating to the operation of the other electronic components in the power generating and management system.

8. The method of claim 7, wherein using a server on the network to access the generator controller includes using the generator controller to schedule operations within the power generating and management system based on the data gathered on the server.

9. The method of claim 8, wherein using the generator controller to schedule operations within the power generating and management system based on the data gathered on the server includes storing timing parameters within the server relating to operation of the other electronic components that are part of the power generating and management system and using the generator controller to operate the other electronic components utilizing the timing parameters.

10. The method of claim 8, wherein using the generator controller to schedule operations within the power generating and management system includes activating at least one of the electronic components within the power generating and management system.

11. The method of claim 8, wherein using the generator controller to schedule operations within the power generating and management system includes collecting sensor data from at least one of the electronic components within the power generating and management system.

12. A method of using a network to control a power generating and management system, the method comprising:
   using a server on the network to access a generator controller that is part of the power generating and management system, wherein the generator controller is configured to operate a generator that produces power;
   using the network to update programming on the generator controller that is received from the server; and
   using the generator controller to control other electronic components that are part of the power generating and management system using the updated programming; and
   using an electronic device to exchange data with a server on the network such that the server receives updated programming for the other electronic components that are part of the power generating and management system from the electronic device, and the server provides the updated programming for the other electronic components that are part of the power generating and management system to the generator controller, wherein the generator controller provides the updated programming for the other electronic components to the other electronic components that are part of the power generating and management system.

13. The method of claim 12, further comprising using an electronic device to exchange data with a server on the network such that the server receives the updated programming for the generator controller from the electronic device and the server provides the updated programming to the generator controller.

14. The method of claim 13, further comprising collecting data with the electronic components that are part of the power generating and management system and providing the data to the generator controller, wherein the updated programming on the generator controller operates the power generating and management system based on the data.

15. The method of claim 12, further comprising collecting data with the electronic components that are part of the power generating and management system, wherein the updated programming on the electronic components that was received from the generator controller operates the electronic components based on the data.

16. The method of claim 12, wherein the other electronic components include at least one of an automatic transfer switch, a load control module and sensor inputs and power switching outputs.

17. A method of using a network to control a power generating and management system, the method comprising:
using a server on the network to access a generator controller that is part of the power generating and management system, wherein the generator controller is configured to operate a generator that produces power; and
using the network to synchronize a server clock with a generator controller clock; and
using the generator controller clock to synchronize the generator controller clock with a clock in at least some of the other electronic components that are part of the power generating and management system.

18. The method of claim 17, wherein synchronizing a server clock with a generator controller clock includes using the network to set the server clock.

\* \* \* \* \*